United States Patent [19]
Erickson et al.

[11] Patent Number: 5,469,201
[45] Date of Patent: Nov. 21, 1995

[54] INK SUPPLY LINE SUPPORT SYSTEM FOR A CONTINUOUS INK REFILL SYSTEM FOR DISOSABLE INK JET CARTRIDGES

[75] Inventors: Paul R. Erickson, Prior Lake; Tim C. Schooler, Eden Prairie, both of Minn.

[73] Assignee: LaserMaster Corporation, Eden Prairie, Minn.

[21] Appl. No.: 298,122

[22] Filed: Aug. 30, 1994

Related U.S. Application Data

[63] Continuation of Ser. No. 139,576, Oct. 20, 1993, and a continuation-in-part of Ser. No. 231,275, Apr. 22, 1994, Pat. No. 5,367,328.

[51] Int. Cl.⁶ .................................................. B41J 2/175
[52] U.S. Cl. ................ 347/85; 347/43; 138/120
[58] Field of Search ................ 347/84, 85, 86, 347/43, 40; 138/120, 111; 346/140.1

[56] References Cited

U.S. PATENT DOCUMENTS

| | | | |
|---|---|---|---|
| 3,026,165 | 3/1962 | Roerty | 346/140.1 |
| 3,373,435 | 3/1968 | Strong . | |
| 3,682,422 | 8/1972 | Evans | 248/68 CB |
| 3,782,670 | 1/1974 | Kielma | 248/51 |
| 3,872,881 | 3/1975 | Miller et al. | 137/355.17 |
| 4,183,031 | 1/1980 | Kyser et al. | 346/140 R |
| 4,308,642 | 1/1982 | Heyman | 24/306 |
| 4,311,293 | 1/1982 | Tenniswood | 248/49 |
| 4,394,669 | 7/1983 | Ozawa et al. | 346/140 R |
| 4,429,320 | 1/1984 | Hattori et al. | 346/140 R |
| 4,475,116 | 10/1984 | Sicking et al. | 346/140 R |
| 4,513,297 | 4/1985 | Okamura | 346/140 R |
| 4,590,495 | 5/1986 | Okamura | 346/140 R |
| 4,684,962 | 8/1987 | Hirosawa et al. | 248/140 R |
| 4,702,281 | 10/1987 | Moritz | 138/120 |
| 4,775,871 | 10/1988 | Abe | 346/140 R |
| 4,807,432 | 2/1989 | Mauri | 59/78.1 |
| 4,999,652 | 3/1991 | Chan | 346/140 R |
| 5,025,270 | 6/1991 | Umezawa | 346/140 R |
| 5,043,746 | 8/1991 | Abe | 346/140 R |
| 5,339,866 | 8/1994 | Holt | 138/111 |

FOREIGN PATENT DOCUMENTS

| | | | |
|---|---|---|---|
| 3709782 | 10/1988 | Germany | 138/120 |
| 356034461A | 4/1981 | Japan . | |
| 358194563A | 11/1983 | Japan . | |
| 360264255A | 12/1985 | Japan . | |
| 362152885A | 7/1987 | Japan . | |
| 362220341A | 9/1987 | Japan . | |
| 120655 | 5/1988 | Japan | 347/85 |
| 401176565A | 7/1989 | Japan . | |
| 169671 | 7/1993 | Japan | 347/85 |
| 2011576 | 7/1979 | United Kingdom | 138/120 |

OTHER PUBLICATIONS

Oberg et al., Machinery's Handbook, 22nd Edition, 1986, pp. 294–295.

Primary Examiner—N. Le
Attorney, Agent, or Firm—Patterson & Keough

[57] ABSTRACT

An ink supply line support system (100) for a continuous ink refill system (10) for an ink jet printer (90) having a print carriage (91) that traverses across a print bed (96) and is adapted to receive one or more disposable ink jet cartridges (12). The ink supply line support system (100) includes an elongate guide structure (102) having a first end (104) operably connected to the ink jet printer (90) at a fixed location (106) and a second end (108) operably connected to the print carriage (91). The second end (108) is movable relative to the first end (104) in a first orientation along the direction in which the print carriage (91) traverses across the ink jet printer (90), but is substantially rigid relative to the first end in a second orientation that is transverse to the first orientation. An attachment mechanism (110) is positioned along an exposed surface (111) of the guide structure (100) for detachably securing at least a portion of at least one ink supply line (16) to the guide structure (102). The ink supply line support system (100) is particularly adapted for large format ink jet printers (90) that are capable of producing high quality, full ink coverage prints on print beds (96) greater than 61 cm (24 inches) wide.

43 Claims, 4 Drawing Sheets

INK SUPPLY LINE SUPPORT SYSTEM FOR A CONTINUOUS INK REFILL SYSTEM FOR DISOSABLE INK JET CARTRIDGES

RELATED APPLICATIONS

The present invention is a continuation-in-part application of two prior applications filed with the United States Patent and Trademark Office, the first of which was filed on Oct. 20, 1993, Ser. No. 08/139,576, entitled CONTINUOUS INK REFILL SYSTEM FOR DISPOSABLE INK JET CARTRIDGES HAVING A PREDETERMINED INK CAPACITY, the second of which was filed on Apr. 22, 1994, Ser. No. 08/231,275, entitled AUTOMATIC INK REFILL SYSTEM FOR DISPOSABLE INK JET CARTRIDGES, both of which are assigned to the assignee of the present invention.

FIELD OF THE INVENTION

The present invention broadly relates to ink jet printers. More specifically, the present invention relates to an ink supply line support system for a continuous ink refill system for ink jet printers that utilize disposable ink jet cartridges.

BACKGROUND OF THE INVENTION

Ink jet printers and plotters are well known. The print quality of these printers is dependent on the consistent, successful functioning of the ink jet print heads which are susceptible to clogging and failure over time. To overcome the problems with deterioration of ink jet print heads over time, it is necessary to periodically replace the print heads. Early solutions to this problem replaced only the print head, as shown, for example, in U.S. Pat. No. 4,074,284. More recently, disposable ink jet cartridges have been developed to solve this problem, as described, for example, in U.S. Pat. Nos. 4,500,895, 4,921,811 and 4,931,812.

Disposable ink jet cartridges of this type are designed to operate for a useful life such that the head elements will function a very high percentage of the time (e.g., 99% of the time) during the life of the disposable cartridge. To ensure that this demanding performance figure is maintained, conventional disposable ink jet cartridges have a predetermined amount of ink contained within the cartridge that is available to be dispensed through the print head. The maximum amount of ink that is contained in the disposable cartridge is a function of how much printing the print head elements can do before failing to function at the very high performance percentage. Once the predetermined amount of ink in the cartridge is used, the entire ink jet cartridge is discarded.

While the use of disposable cartridge has effectively guaranteed the print quality of ink jet printers at the failure rate dictated by the particular disposable cartridge, there are many print applications which could tolerate a higher failure rate in exchange for an extended period of operation of the ink jet print head. Unfortunately, when existing disposable ink jet cartridges run out of ink, the print head is still functioning adequately in the vast majority of cases. Discarding ink jet cartridges that still have adequately functioning print heads wastes resources. In addition, frequent replacement of ink jet cartridges is time and labor intensive for large print applications.

To solve this problem, several systems have been developed for refilling ink jet cartridges in order to prolong the useful life of the print heads. These systems include manual refilling of the ink jet cartridges, refilling the ink jet cartridges using a mechanical system of valves and pumps as described in U.S. Pat. No. 4,680,696, or periodically refilling the ink jet cartridges as part of a service-station type operation as described, for example in U.S. Pat. Nos. 4,959,667 and 5,136,305. Of the ink refill systems developed for ink jet printers that utilize disposable ink jet cartridges, the ink refill system with the most advantages has been a continuous ink refill system of the type described, for example, in U.S. Pat. Nos. 4,831,389 and 5,159,348.

In U.S. Pat. No. 4,831,389 issued to Chan, a continuous ink refill system delivers refill ink through supply tubes from a refillable off board ink supply to an ink jet print head positioned on the print carriage by capillary action created during an ink jet printing operation. In U.S. Pat. No. 5,159,348 issued to Dietl et al., a continuous ink refill system includes an ink reservoir mounted on the print carriage that supplies ink to the print head and is also connected by supply and return lines to an ink source that is remote from the print carriage. In Dietl et al., the supply line includes a restrictor that prevents a passive flow of ink greater than can be handled by the print head, and also includes a pump in the supply lines for priming the ink reservoir and the print head. Other examples of ink supply line arrangements for ink jet printers that do not use disposable ink jet cartridges are shown in U.S. Pat. Nos. 4,394,669, 4,475,116 and 4,590,495, as well as Japanese Abstracts Nos. 54-110682, 57-77546, 59-12027, 60-297219, and 61-63789.

As the speed at which the print carriages of these types of ink jet printers travels across the print bed has increased, and as the transverse distance of the print beds has also increased, a problem with the continuity and regularity of the flow of refill ink has been encountered with continuous ink refill systems. Intermittent surges or vacuums in the ink refill system may interfere with the delicate pressure balance required by the print head of the disposable ink jet cartridge. As a result, intermittent ink spotting or weeping, or missing or diminished ink pixels can occur. In addition, line movement or chatter in the ink supply lines can result in printing artifacts that degrade the overall print quality of the image.

In an effort to provide some support for ink supply lines, some ink jet printers that use fixed print heads, rather than disposable ink jet cartridges, have integrated or molded the ink supply lines inside a flexible conduit, as shown, for example, by U.S. Pat. Nos. 3,373,435, 5,025,270 and 5,043,746, as well as Japanese Abstract No. 62-335368. Although the increased stability of the flexibile conduit tends to decrease intermittent surges and vacuums in the ink refill system, in each of these references, the flexible conduit remains relatively free to move in an essentially undetermined path along the print bed as the print carriage traverses back and forth across the ink jet printer. In addition, the ink supply lines are permanently mounted to the flexible conduit and to the permanent print heads and therefore cannot be easily replaced.

While the use of continuous ink refill systems for disposable ink jet cartridges has increased the period of operation for ink jet printers using these cartridges, these types of continuous ink refill systems tend to decrease the overall print quality, particularly in larger and faster ink jet printers. Consequently, a disposable ink jet cartridge refill system that can increase the period of operation of the ink jet printer without significantly detracting from the overall print quality of the ink jet printer would be greatly appreciated.

SUMMARY OF THE INVENTION

The present invention is an ink supply line support system for a continuous ink refill system for an ink jet printer having a print carriage that traverses across a print medium and is adapted to receive one or more disposable ink jet cartridges. The ink supply line support system includes an elongate guide structure having a first end operably connected to the ink jet printer at a fixed location and a second end operably connected to the print carriage. The second end is movable relative to the first end in a first orientation along the direction in which the print carriage traverses across the ink jet printer, but is substantially rigid relative to the first end in a second orientation that is transverse to the first orientation. An attachment mechanism is positioned along the guide structure for detachably securing at least a portion of the at least one ink supply line to an exposed surface of the guide structure. The ink supply line support system is particularly adapted for large format ink jet printers that are capable of producing high quality, full ink coverage prints on print beds greater than 61 cm (24 inches) wide.

It is believed that, because existing continuous ink refill systems generally lack any type of structure for supporting the ink supply lines, disruptions in the continuity and regularity of the flow of the refill ink may be created when the ink supply lines are subjected to movement of the print carriage during operation of the ink jet printer. In addition, line movement or chatter in the ink supply lines, particularly in an orientation transverse to the direction of motion of the print carriage, can result in printing artifacts that degrade the overall print quality of the image, as well as motion control errors that would cause the printer to abort the printing of the image. The lack of a support structure for the ink supply lines also allows for the possibility of crimps or bends in the ink supply lines if the ink supply lines becomes tangled with the print carriage, for example, during operation of the ink jet printer. These problems are particularly acute in ink jet printers which have larger print beds and which operate at higher print carriage speeds. Due to the high degree of sensitivity of image quality in large format ink jet printing operations, as well as the extremely large penalty in time and materials caused when a print job must be aborted, printing errors induced by the lack of adequate support for the ink supply lines cannot be tolerated.

In accordance with a first aspect of the present invention, an ink supply line support apparatus is provided for a continuous ink refill system for an ink jet printer having a print carriage that traverses across a print medium and is adapted to receive at least one disposable ink jet cartridges. The ink refill apparatus includes at least one disposable ink jet cartridge removably mountable in the print carriage, at least one ink reservoir external to the print carriage, and at least one flexible ink supply line that couples the at least one ink reservoir to the at least one ink supply container so as to supply ink to the ink jet cartridge during operation of the ink jet printer. The ink supply line support apparatus comprises an elongate guide structure having a first end operably connected to the ink jet printer at a fixed location and a second end operably connected to the print carriage. The second end is movable relative to the first end in a first orientation along the direction in which the print carriage traverses, but is substantially rigid relative to the first end in a second orientation that is transverse to the first orientation. The guide structure is for supporting at least a portion of the at least one ink supply line on an exposed surface of the guide structure means while the second end is moved relative to the first end as the print carriage traverses across the ink jet printer. An attachment mechanism positioned along the exposed surface of the guide structure means detachably secures the portion of the at least one ink supply line to the guide structure means.

In accordance with a second aspect of the present invention, a continuous ink refill system is provided for an ink jet printer having a print carriage that traverses across a print medium and is adapted to receive one or more disposable ink jet cartridges. The ink refill system comprises a replaceable ink supply component and an ink supply line support apparatus. The replaceable ink supply component includes at least one disposable ink jet cartridge removably mountable in the print carriage, at least one ink reservoir external to the print carriage, and at least one flexible ink supply line that couples the at least one ink reservoir to the at least one ink supply container so as to supply ink to the ink jet cartridge during operation of the ink jet printer. The ink supply line support apparatus includes an elongate guide structure having a first end operably connected to the ink jet printer at a fixed location and a second end operably connected to the print carriage. The second end is movable relative to the first end as the print carriage traverses across the ink jet printer and the guide structure has an exposed surface on which the at least one flexible ink supply line is carried. Attachment mechanisms positioned along the guide structure detachably secure at least a portion of the at least one ink supply line to the exposed surface of the guide structure.

In a preferred embodiment, the elongate guide structure is a chain-like structure having a plurality of guide link elements pivotally connected to one another. Alternatively, the elongate guide structure may be a unitary piece of rigid, flexible material such as a metal band, a metal channel, a metal tube, or a plastic strip, a plastic channel or a plastic tube which is essentially rigid in all but one orientation. Typically, the elongate guide structure will form a generally U-shaped structure having an outwardly facing exposed surface and an inwardly facing exposed surface and the attachment mechanism will be positioned along the outwardly facing exposed surface. Preferably, the first end of the elongate guide structure is attached to the ink jet printer at a fixed location rearward of a guide rail such that the elongate guide structure is movable in a space within the ink jet printer behind the guide rail as the print carriage traverses along the guide rail, and the fixed location is a longitudinal located proximate a mid-point of a traverse width of the print carriage. In the preferred embodiment, there are a plurality of ink supply lines and the attachment means in the elongate guide structure are arranged such that the portion of the plurality of ink supply lines carried by the elongate guide structure are vertically spaced apart from one another.

To further dampen oscillations in the ink supply line support structure caused by movement of the print carriage, a flexible, stiffening member may be longitudinally disposed alongside the elongate guide structure. An in-line attachment structure to which the second end of the elongate guide structure is attached may be used to counteract the effect of motion in the guide structure. The in-line attachment structure is secured to the print carriage approximately in-line with a guide rail on which the print carriage traverses. Alternatively, an outrigger structure may also be added to which the second end of the elongate guide structure is attached. The outrigger structure is attached to the print carriage opposite a side of the print carriage at which the ink jet cartridges are mounted such that a moment arm of the outrigger structure and a portion of the elongate guide structure attached to the outrigger structure balances a moment arm of the ink jet cartridges relative to a guide rail on which the print carriage traverses.

With respect to the second aspect of the present invention, the replaceable ink supply component preferably includes a plurality of replaceable subcomponents. Each subcomponent is comprised of a disposable ink jet cartridge, an ink reservoir and a flexible ink supply line having a pair of ends one of which is inserted into the ink jet cartridge and the ink reservoir, respectively, and each of which is fixedly attached proximate to the end of the ink supply line to the ink jet cartridge and the ink reservoir, respectively. Preferably, the replaceable subcomponents are arranged as unitary, replaceable members.

DETAILED DESCRIPTION OF THE PREFERRED EMBODIMENT

Figure 1:
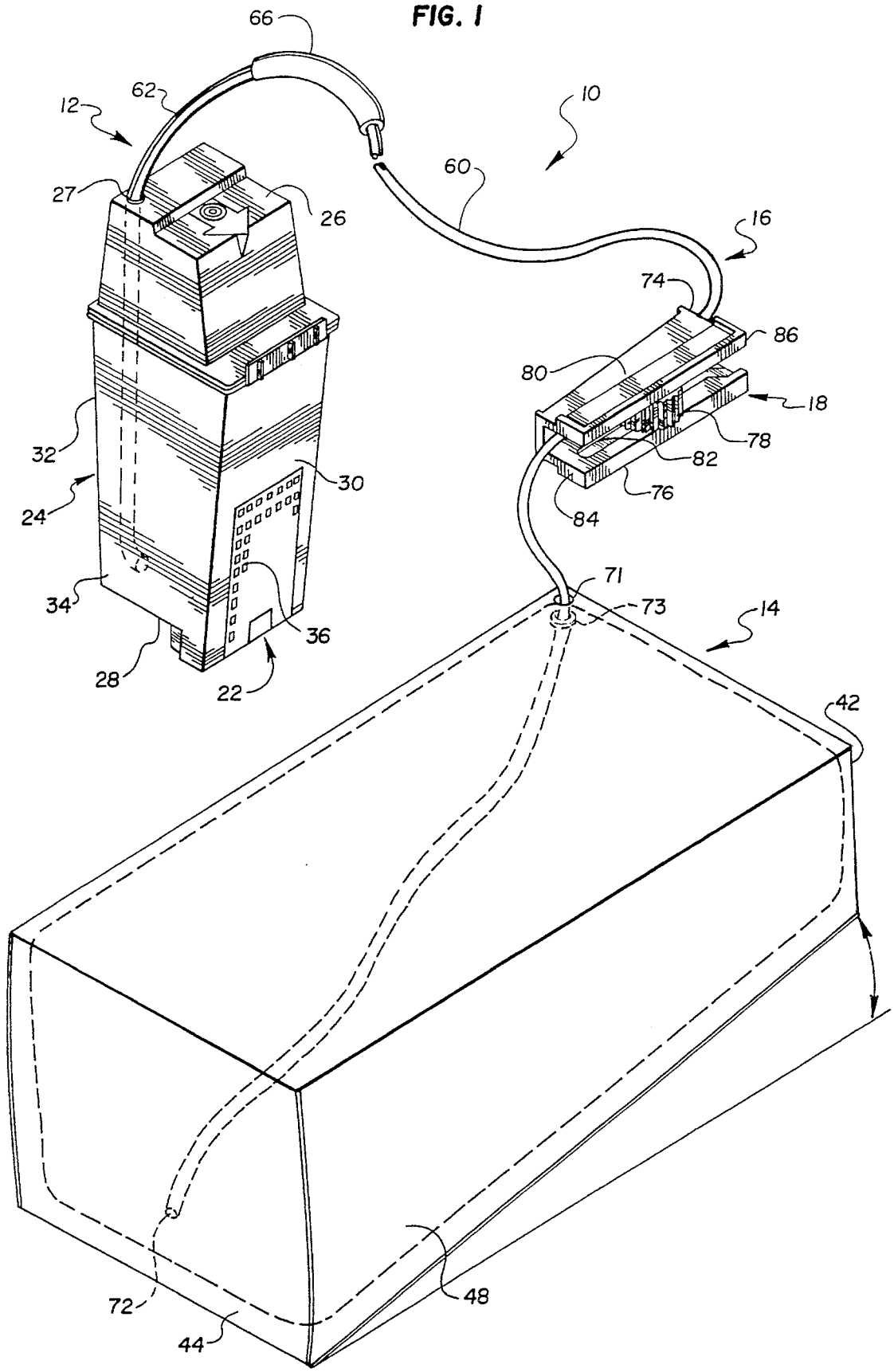
FIG. 1 depicts a perspective view of a preferred embodiment of a unitary, replaceable component of a continuous refill system for disposable ink jet cartridges in accordance with the present invention prior to installation in an ink jet printer and with various parts shown in phantom lines.

Reference is now made to the drawings, wherein like reference numerals denote like elements throughout the several views. Referring to FIG. 1, the preferred embodiment of a unitary, replaceable ink supply component 10 of a continuous ink refill system prior to installation in an ink jet printer broadly includes a disposable ink jet cartridge 12, an ink reservoir container 14, connecting ink supply line system 16 and ink flow regulating component 18. A brief description of the preferred embodiment of replaceable ink supply component 10 will be presented to facilitate the understanding of the present invention. For a more detailed description of the operation of the preferred embodiment of replaceable ink supply component 10, reference is made to the previously identified parent applications for the present invention entitled CONTINUOUS INK REFILL SYSTEM FOR DISPOSABLE INK JET CARTRIDGES HAVING A PREDETERMINED INK CAPACITY and AUTOMATIC INK REFILL SYSTEM FOR DISPOSABLE INK JET CARTRIDGES.

Disposable ink jet cartridge 12 broadly includes a print head 22 and an ink supply container 24 as part of a disposable self-contained unit that presents a cartridge top 26, base 28, front 30, rear 32 and opposed sides 34. As described in more detail in connection with the description of FIGS. 2 and 3, disposable ink jet cartridge 12 is loaded into an ink jet printer 90 by mounting disposable ink jet cartridge 12 in a print carriage 91 that moves laterally with respect to a generally horizontally-oriented print media. Print head 22 includes a plurality of head elements 36 that are electrically connected to a control unit (not shown) within ink jet printer 90. Ink supply container 24 is operably coupled to print head 22. Methods of coupling ink supply container 24 to print head 22 are well known in the art as shown, for example, in U.S. Pat. Nos. 4,500,895, 4,921,811 and 4,931,812. In the preferred embodiment, ink supply container 24 can hold at least 40 cc of ink. In the preferred embodiment, disposable ink jet cartridge 12 is a HP High Capacity print cartridge available from Hewlett-Packard Company, or an equivalent disposable ink jet cartridge, including ink jet cartridges with foam inserts.

Referring again to FIG. 1, connecting ink supply line system 16 includes one or more pieces of very flexible tubing 60 extending from ink supply container 24 to ink reservoir container 14. In a preferred embodiment, flexible tubing 60 is inserted through an aperture 27 in cartridge top 26 and is extended to a point where a distal end of flexible tubing 60 is located approximately at the bottom of cartridge 24. Flexible tubing 60 is glued to aperture 27, thereby sealing cartridge 24 and providing strain relief for flexible tubing 60.

In addition, connecting ink supply line system 16 preferably includes a formable yet rigid tube 62, flexible tubing 60 and seal 66. Rigid tube 62 is inserted into ink supply container 24 through cartridge top 26 adjacent to cartridge rear 32 and one of the opposed cartridge sides 34 and extends downwardly into ink supply container 14. Rigid tube 62 is joined to cartridge top 26 in an airtight seal and includes appropriate strain relief. Rigid tube 62 includes an upper portion extending upwardly and generally horizontally above cartridge top 26. In this embodiment, tubing 60 is operably joined to upper portion of rigid tubing 62 by seal 66. In this embodiment, seal 66 is a hollow cylinder of a slightly larger diameter than tube 62 and tubing 60 that encloses and overlaps the upper end of tube 62 of tubing 60 to form a permanent airtight seal.

Flexible tubing 60 presents a reservoir end 72. In the preferred embodiment, tubing 60 presents an outside diameter of about 0.3175 cm (0.125 inches) and an inside diameter compatible with 0.1588 cm (1/16 inch) tube fittings. Reservoir end 72 extends into the ink bag 48 through aperture 71 and is attached to the ink bag 48 along a bottom interior surface near reservoir large end 44. As with ink supply container 24, reservoir end 72 in ink reservoir container 14 is provided with appropriate strain relief. In a preferred embodiment, the strain relief is provided by affixing a portion of reservoir end 72 around the circumference of a small disc 73 having a diameter greater than aperture 71 that is located inside of ink reservoir 14, but outside of ink bag 48, on small end 42 near aperture 71, for example.

In the preferred embodiment, ink flow regulating component 18 is a stopcock 74. As those skilled in the art will understand, stopcock 74 may be of any type that is switchable between an open and closed position such that ink may flow through piping system 16 when stopcock 74 is in the open position and ink will not flow through piping system 16 when stopcock 74 is in the closed position, such as a conventional quarter-turn ball valve stopcock. In the embodiment shown in FIG. 1, stopcock 74 includes structure defining a tubing channel 76 and a pressure wheel 78. Tubing channel 76 includes a sloped channel floor 80 and opposed side walls 82. Channel floor 80 angles upward from a first end 84 of channel 76 to opposed second end 86.

Channel 76 is of sufficient width and depth at the first end 84 to support the tubing 60 and at least half of pressure wheel 78. At second end 86, the depth of channel 76 is less than that at first end 84 and is sufficient to support pressure wheel 78 such that pressure wheel 78 pinches tubing 60 against channel floor 80 to prevent the ink from flowing through tubing 60. One advantage of stopcock 74 over some other types of stopcocks is that stopcock 74 does not require that tubing 60 be cut in order to accommodate the stopcock.

Figure 2:
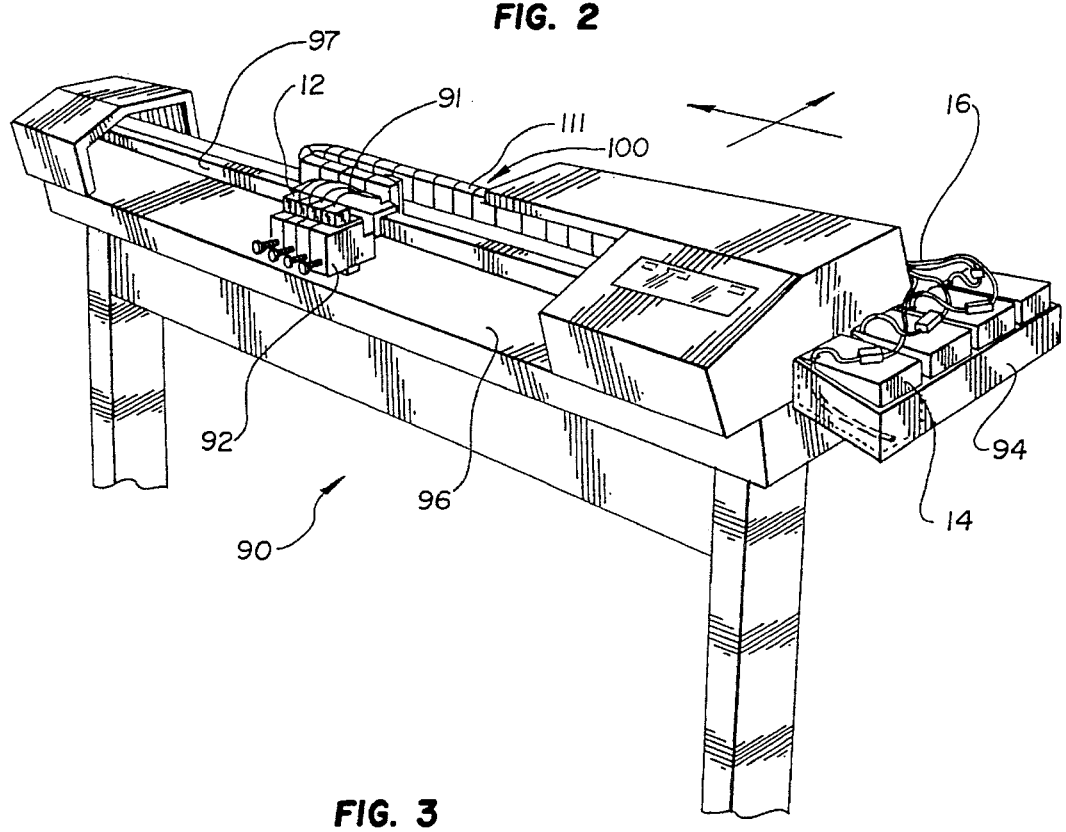
FIG. 2 is a perspective view of a preferred embodiment of an ink refill system in accordance with the present invention installed in an ink jet printer.
Figure 3:
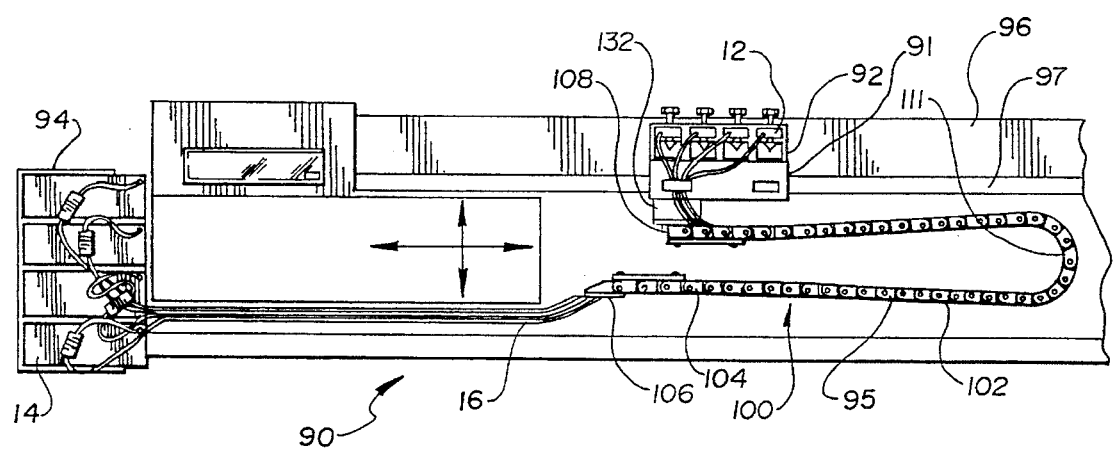
FIG. 3 is a top view of the preferred embodiment of the refill system of FIG. 2 installed in an ink jet printer

Referring to FIGS. 2 and 3, ink jet printer 90 includes a print carriage 91 with a plurality of cartridge holders 92, a reservoir support 94, ink supply line support system 100 and print platen 96. A disposable ink jet cartridge 12 is installed in a cartridge holder 92 and aligned with other like disposable ink jet cartridges 12 such that each print head 22 is positioned above and adjacent to print platen 96 and is aligned with every other print head 22. Ink reservoir container 14 for the disposable ink jet cartridge 12 is placed in a corresponding partition in reservoir support 94. Print platen 96 supports paper or other print media (not shown) on which a predetermined pattern is to be printed under control of a control unit (also not shown).

With this description of ink jet printer 90 and replaceable ink supply component 10 in mind, the preferred embodiment of an ink supply line support system 100 of the present invention will now be discussed.

Unlike existing continuous ink refill systems for disposable ink jet cartridge-type printers, such as represented by U.S. Pat. No. 4,831,389 issued to Chan and U.S. Pat. No. 5,159,348 issued to Dietl et al., ink supply line support system 100 provides a structure for the ink refill system that fixes the movement of ink supply line system 16 during operation of the ink jet printer. In Chan, for example, a single tube support and spacer structure serves to permanently maintain the four supply tubes shown in Chan in place as they extend to an external ink reservoir container. There is no provision, however, for structure to secure the ink supply tubes within the ink jet printer as the print carriage traverses across the print plates. Instead, the ink supply tubes are simply allowed to dangle within the interior space of the ink jet printer. The same problem exists in Dietl et al., only the problem is compounded by the fact that there are twice as many supply tubes for each print head in Dietl et al which are allowed to move freely and are only constrained by attachment to the print head and the external reservoir.

Neither of the ink refill systems described in Chan or Dietl et al. provide for or even suggest any reason for providing a support structure for the ink supply lines between an external reservoir and the ink reservoir on a disposable ink jet cartridge, for example. In at least one existing ink jet printer, a horizontally-oriented, chain-like support structure has been used to carry electronic cabling between the print heads on the print carriage and an electronic control board mounted elsewhere on the ink jet printer. When this ink jet printer is provided with an ink refill system, however, the chain-like support structure for the electronic cabling is not used to carry any of the ink supply tubes. Instead, as in the Chan and Dietl et al. patents, the ink supply tubes are simply left hanging off the back of the print bed, or are allowed to snake along the bottom of an open cavity behind the print bed. Other patents have described structures for supporting or attaching hoses and the like, as shown in U.S. Pat. Nos. 3,782,670, 4,311,293, 4,807,432, 3,682,422, 3,872,881, 4,308,642 and 4,775,121. Again, however, none of these references provide any teaching or motivation that the structures taught by these references would have particular application to a continuous ink refill system for an ink jet printer that utilizes disposable ink jet cartridges.

The present invention recognizes that the lack of a support structure for the ink supply tubes can be responsible for disruptions in the continuity and regularity of the flow of the refill ink that can be created when the ink supply lines are subjected to movement of the print carriage during operation of the ink jet printer. In addition, line movement or chatter in the ink supply lines, particularly in an orientation transverse to the direction of motion of the print carriage, can result in printing artifacts that degrade the overall print quality of the image, as well as motion control errors that would cause the printer to abort the printing of the image. The lack of a support structure for the ink supply lines also allows for the possibility of crimps or bends in the ink supply lines if the ink supply lines becomes tangled with the print carriage, for example, during operation of the ink jet printer. These problems are particularly acute in ink jet printers which have larger print beds and which operate at higher print carriage speeds. Due to the high degree of sensitivity of image quality in large format ink jet printing operations, as well as the extremely large penalty in time and materials caused when a print job must be aborted, printing errors induced by the lack of adequate support for the ink supply lines cannot be tolerated. The present invention solves all of these problems by providing an ink supply line support system 100 which supports at least a portion of ink supply line system 16 that is subject to movement in response to the transverse movement of print carriage 91 across print platen 96.

Figure 8:
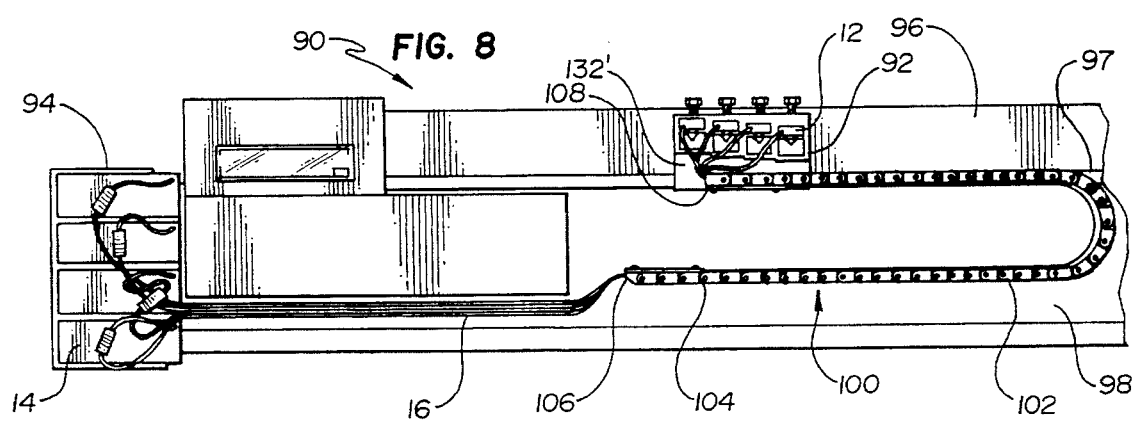
FIG. 8 is a top view of an alternate embodiment of an ink refill system in accordance with the present invention installed in an ink jet printer.

With reference to FIG. 8, ink supply line support system 100 includes an elongate guide structure 102 having a first end 104 operably connected to ink jet printer 90 at a fixed location 106 and a second end 108 operably connected to print carriage 91. Second end 108 is movable relative to first end 104 in a first orientation along the direction in which the print carriage 91 traverses across the ink jet printer 90, but is substantially rigid relative to the first end in a second orientation that is transverse to the first orientation. At least a portion 95 of ink supply line system 16 extends between ink supply container 24 of disposable ink jet cartridge 12 and ink reservoir container 14 through and is carried by ink supply line support system 100. An attachment mechanism 110 as shown best in FIG. 5 is positioned along guide structure 102 for detachably securing portion 95 of ink supply line 16 to guide structure 102 along an exposed surface 111 of guide structure 102.

Figure 4:
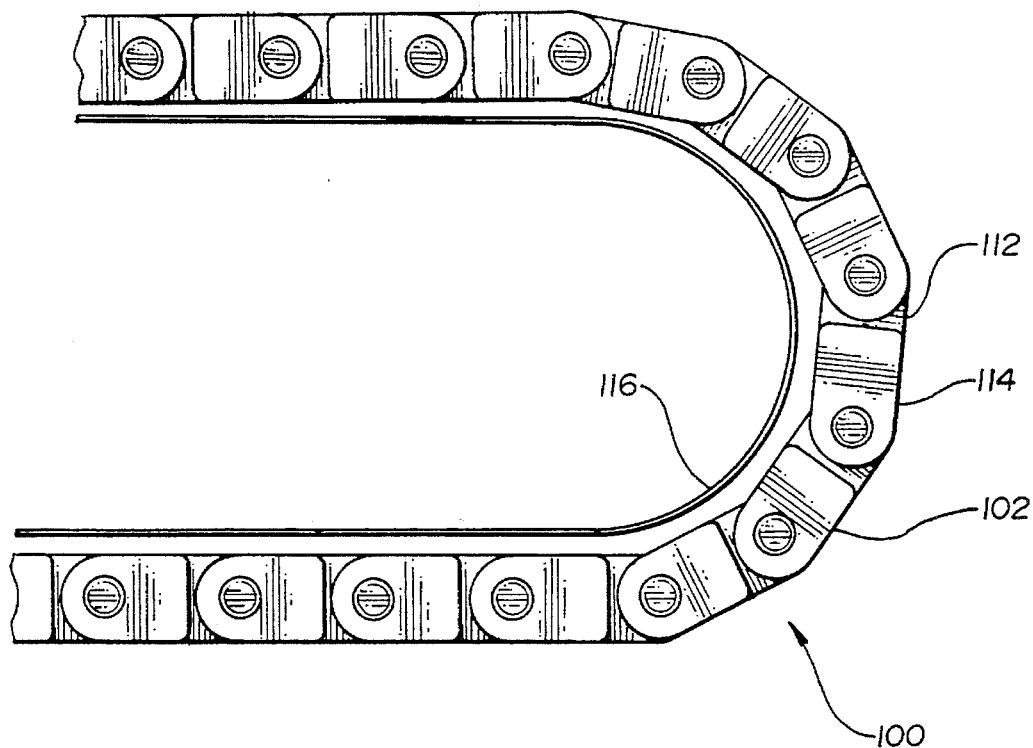
FIG. 4 is a top detail view of a preferred embodiment of an ink supply line support apparatus of the present invention.
Figure 5:
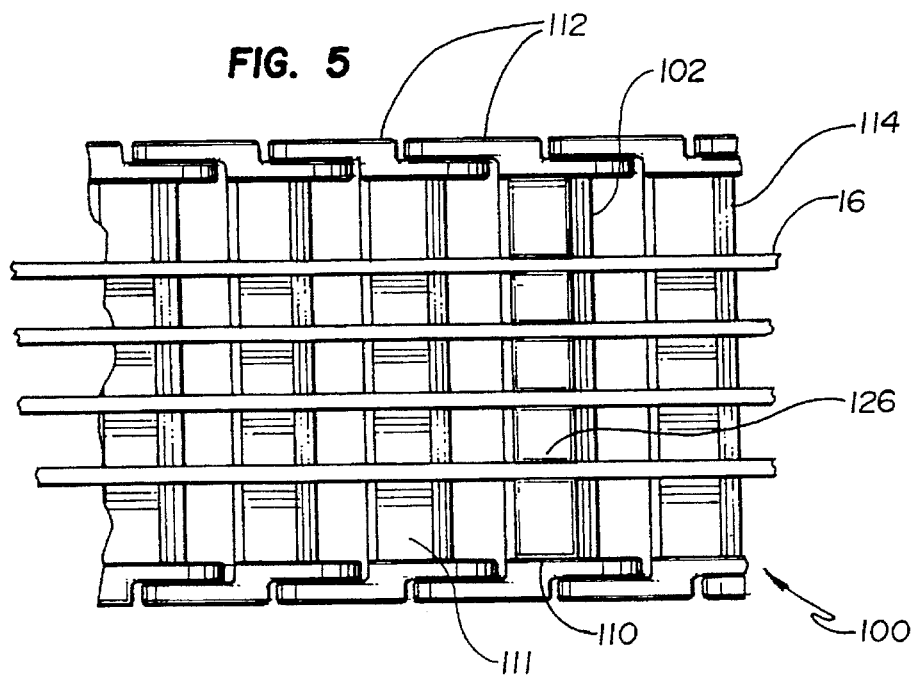
FIG. 5 is a side detail view of the preferred embodiment of the ink supply line support apparatus of FIG. 4 shown with the ink supply tubes as installed.

In one embodiment as shown in FIGS. 4 and 5, guide structure 102 is comprised of a chain-like structure having a plurality of guide link elements 112 pivotally connected to one another. In a preferred embodiment, each of the guide link elements 112 are generally vertically oriented and together present a generally U-shaped support structure have an outwardly facing channel 114 in which ink supply line system 16 is carried. A flexible stiffening member 116 may be inserted on the inside surface of guide structure 102 to act as a guide for chain guide elements 112 as guide structure 102 responds to the movement of print carriage 91, thereby making the chain feed more uniform and preventing clogging in line system 16. Typically, stiffening member 116 would be a metal band, whereas guide link elements 112 are made of a rigid plastic material, although other combinations of materials could also be used to accomplish the same purpose.

Figure 6:
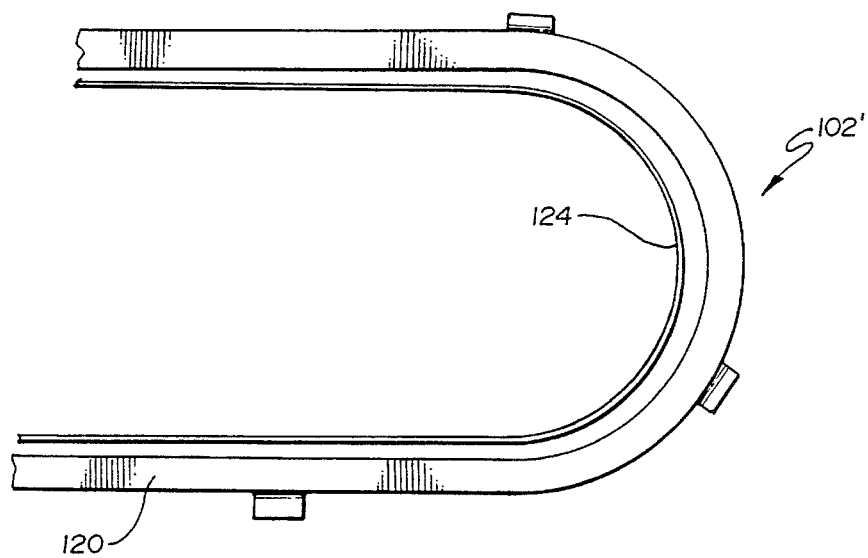
FIG. 6 is a top detail view of an alternate embodiment of an ink supply line support apparatus in accordance with the present invention.
Figure 7:
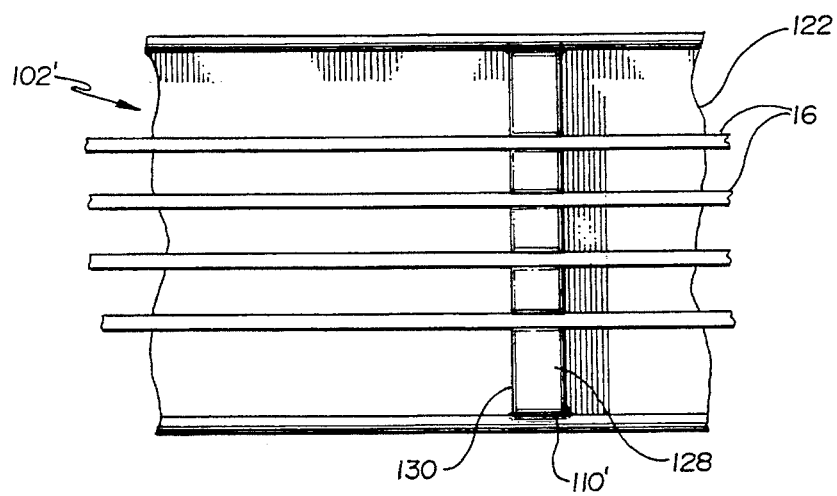
FIG. 7 is a side detail view of the alternate embodiment ink supply line support apparatus of FIG. 6 shown with the ink supply tubes as installed.

In another embodiment as shown in FIGS. 6 and 7, guide structure 102' is comprised of a unitary piece of rigid, flexible material 120 selected from the set comprising: a metal band, a metal channel, a metal tube, or a plastic strip, a plastic channel or a plastic tube which is essentially rigid in all but one orientation. Although guide structure 102' may be made from a hollow material, such as a tube, in the preferred embodiment the need to conveniently access attachment mechanism 110 positioned along guide structure 102' dictates that some type of exposed surface of guide structure 102' be used to carry ink supply line system 16, as compared to a completely internal surface within the tube, for example. In a preferred embodiment, material 120 includes structure that forms an outwardly facing channel 122 in which ink supply line system 16 is carried. As material 120 is a unitary piece of material, a stiffening member, such as member 124, would typically not be required, although the use of stiffening member 124 would increase the range of materials and arrangements that might be used to create guide structure 102'.

As shown in FIGS. 5 and 7, attachment mechanism 110 secures ink supply line system 16 to guide structure 102 replaceable ink supply component 10 in a detachable manner, rather than in a fixed manner, so that replaceable ink supply component 10 can be easily removed and replaced. Because the preferred embodiment of replaceable ink supply component 10 includes a plurality of unitary, replaceable subcomponents, each subcomponent including a disposable ink jet cartridge 12, an ink reservoir 14 and ink supply line system 16 as part of a single component, it is preferable not to fixedly attach ink supply line system 16 to guide structure 102 and only replace ink jet cartridge 12 and ink reservoir 14. To do so, would impose additional priming and purging requirements and would allow for contamination of ink supply line system 16 during a replacement operation. Accordingly, in a preferred embodiment of the present invention, attachment mechanism 110 detachably secures ink supply line system 16 to guide structure 102.

In the embodiment shown in FIG. 5, attachment mechanism 110 consists of a frictional fit spacer 126 into which each one of the supply line of ink supply line system 16 are forcibly positioned. In this embodiment, a plurality of spacers 126 are used and are spaced approximately one every 7–10 cm (3–4 inches). In the embodiment shown in FIG. 7, attachment mechanism 110' consists of a pivoting clamp mechanism 128 having a closure 130 used to secure the supply lines of ink supply line system 16. Still another embodiment would provide the attachment mechanism 110 by a combination of a channel-like structure, such as channel 114 as shown in FIG. 5, and fixed length ink supply lines for ink supply line system 16, the fixed length of the ink lines being such that the ink supply lines are effectively attached to and carried by the channel by virtue of the fact that there is no slack in the ink supply lines to allow them to fall out of channel 114. Although these embodiments are presented for illustrative purposes, it will be recognized by one skilled in the art that numerous other type of fastening mechanisms could be used with the present invention, such as a retaining block and bolt or screw arrangement, a strip of tiny clasp-and-hook mechanisms such as Velcro®, an arrangement where a spacer portion of attachment mechanism 110 into which ink supply line system 16 would be fixedly attached and then the spacer portion could be snappably or mechanically secured to guide structure 102.

In another alternate embodiment of the present invention, some of the benefits of the present invention can still be obtained in those situations where ink supply line system 16 is not replaced each time ink reservoir 14 is changed. In this situation, attachment mechanism 110 could be structure for carrying ink supply line 16 internal to guide structure 102 such that ink supply line system 16 need only be secured to or located within guide structure 102. In this embodiment, it has been found that guide structure 102 is preferably the chain-like structure shown in FIGS. 2 and 3 oriented in vertical manner. By utilizing this chain-like structure, a more positive control on the position of ink supply line system 16 is maintained as print carriage 91 traverses across ink jet printer 90, thereby decreasing the likelihood of surges or vacuums within ink supply line system 16.

In a preferred embodiment as shown in FIGS. 2 and 3, print carriage 91 traverses along a guide rail 97 positioned at a forward position in ink jet printer 90 relative to a path of travel of print medium (not shown) through ink jet printer 90. In this embodiment, second end 108 of elongate guide structure 102 is attached to ink jet printer 90 at a position rearward of guide rail 97 such that elongate guide structure 102 is movable in a space 98 within ink jet printer behind guide rail 97 as print carriage 91 traverses along guide rail 97. Preferably, elongate guide structure 102 has a length that is at least as long as a width of ink jet printer 90 over which print carriage 91 traverses. In addition, fixed location 106 at which first end 104 of elongate guide structure 102 is attached to ink jet printer 90 is preferably a longitudinal location that is proximate a mid-point of a traverse width of ink jet printer 90 over which print carriage 91 traverses.

Preferably, elongate guide structure 102 is relatively rigid in a first orientation of a plane through which print carriage 91 traverses across ink jet printer 90 and is relatively flexible in a second orientation of the plane. In the example shown in FIGS. 2 and 3, guide structure 102 is relatively rigid in the vertical orientation and is relatively flexible in the horizontal orientation relative to guide rail 97. Alternatively, if channel 114 of guide structure 102 were oriented in an upwardly facing manner, for example, guide structure 102 would need to be relatively rigid in the horizontal orientation and relatively flexible in the vertical orientation relative to guide rail 97. The vertical orientation of channel 114 of guide structure 102 is preferred and is accomplished by having attachment mechanism 110 are arranged such that the portions of each of the supply lines of ink supply line system 16 carried by elongate guide structure 102 are vertically spaced apart from one another.

An outrigger structure 132 as shown best in FIG. 3 is one manner of attaching second end 108 to print carriage 91, although numerous other arrangements for this attachment are also possible. Outrigger structure 132 is attached to print carriage 91 opposite a side of at which ink jet cartridges 12 are mounted such that a moment of outrigger structure 132 and a portion of elongate guide structure 102 that is attached to outrigger structure 132 balances a moment arm of ink jet cartridges 12 and print carriage 91 relative to guide rail 97 on which print carriage 91 traverses. The preferred arrangement further reduces the mechanical impact of any chain-chatter or other movement of ink supply line system 16 and ink support system 100 on the operation of ink jet cartridges 12. A preferred embodiment for attaching second end 108 to print carriage 91 shown in FIG. 8. An in-line attachment structure 132' is secured to print carriage 91 approximately in-line with guide rail 97 such that vibrations in the elongate guide structure 102 are generally not translated into a moment about print carriage 91.

Numerous characteristics and advantages of the invention have been set forth in the foregoing description. It will be understood, of course, that this disclosure is, in many respects, only illustrative. Changes can be made in details, particularly in matters of shape, size and arrangement of parts without exceeding the scope of the invention.

We claim:

1. An ink supply line support apparatus for a continuous ink refill system for a large format ink jet printer having a print bed that is greater than 61 cm (24 inches) wide and having a print carriage that traverses across a print medium and receives at least one disposable ink jet cartridges, the ink refill system including at least one disposable ink jet cartridge removably mountable in the print carriage, at least one ink reservoir external to the print carriage, and at least one flexible ink supply line that couples the at least one ink reservoir to the at least one ink jet cartridges so as to supply ink to the ink jet cartridge during operation of the ink jet printer, the ink supply line support apparatus comprising:

an elongate guide structure having a length greater than 30.5 cm (12 inches) and having a first end operably connected to the ink jet printer at a fixed location and a second end operably connected to the print carriage, the second end being movable relative to the first end in a first orientation along a direction in which the print carriage traverses, but being substantially rigid relative to the first end in a second orientation that is transverse to the first orientation and the guide structure including means for supporting at least a portion of the at least one ink supply line on an exposed surface of the guide structure; and attachment means positioned along the exposed surface of the guide structure for detachably securing the portion of the at least one ink supply line to the guide structure.

2. The ink supply line support apparatus of claim 1 wherein the elongate guide structure is a chain-like structure having a plurality of guide link elements pivotally connected to one another.

3. The ink supply line support apparatus of claim 1 wherein the elongate guide structure is a unitary piece of rigid, flexible material selected from the group consisting of: a metal band, a metal channel, or a metal tube, or a plastic strip, a plastic channel, or a plastic tube that is relatively rigid in all but one orientation.

4. The ink supply line support apparatus of claim 1 wherein the elongate guide structure forms a generally U-shaped structure having an outwardly facing exposed surface and an inwardly facing exposed surface and the attachment means is positioned along the outwardly facing exposed surface.

5. The ink supply line support apparatus of claim 1 wherein the fixed location at which the first end of the elongate guide structure is attached to the ink jet printer is a longitudinal location that is proximate an end point of a transverse width of the ink jet printer over which the print carriage traverses and has a length that is at least as long as a width of the ink jet printer over which the print carriage traverses.

6. The ink supply line support apparatus of claim 1 wherein the fixed location at which the first end of the elongate guide structure is attached to the ink jet printer is a longitudinal location that is proximate a mid-point of a transverse width of the ink jet printer over which the print carriage traverses.

7. The ink supply line support apparatus of claim 1 wherein the print carriage traverses along a guide rail positioned at a forward position in the ink jet printer relative to a path of travel of a print medium through the ink jet printer and wherein the second end of the elongate guide structure is attached to the ink jet printer at a position rearward of the guide rail such that the elongate guide structure is movable in a space within the ink jet printer behind and generally parallel to the guide rail as the print carriage traverses along the guide rail.

8. The ink supply line support apparatus of claim 1 wherein there are a plurality of ink supply lines and wherein the attachment means in the elongate guide structure are arranged such that the portion of the plurality of ink supply lines carried by the elongate guide structure are vertically spaced apart from one another.

9. The ink supply line support apparatus of claim 1 further comprising:

a flexible, stiffening means longitudinally disposed alongside the elongate guide structure for increasing uniformity of movement of the elongate guide structure as the print carriage traverses across the ink jet printer.

10. The ink supply line support apparatus of claim 1 further comprising:

an outrigger structure to which the second end of the elongate guide structure is attached, the outrigger structure attached to the print carriage opposite a side of the print carriage at which the ink jet cartridges are mounted and extending in a direction opposite from a direction of the ink jet cartridges relative to a guide rail on which the print carriage traverses.

11. The ink supply line support apparatus of claim 1 further comprising:

an in-line attachment structure to which the second end of the elongate guide structure is attached, the in-line attachment structure secured to the print carriage approximately parallel with a longitudinal axis of a guide rail on which the print carriage traverses.

12. An ink supply line support apparatus for a continuous ink refill system for a large format ink jet printer having a print bed that is greater than 61 cm (24 inches) wide and having a print carriage that traverses across a print medium, the ink refill system including at least one flexible ink supply line that couples an ink reservoir on the print carriage to an ink supply container external to the print carriage so as to supply ink during operation of the ink jet printer to at least one print head on the print carriage that is in fluid connection with the ink reservoir, the ink supply line support apparatus comprising:

an elongate guide structure having a length greater than 30.5 cm (12 inches) and having a first end operably connected to the ink jet printer at a fixed location, a second end operably connected to the print carriage, and an exposed surface on which at least a portion of the at least one ink supply line is supported while the second end is moved relative to the first end as the print carriage traverses across the ink jet printer; and a plurality of attachment mechanisms positioned along of the guide structure to detachably secure the portion of the at least one ink supply line to the exposed surface of the guide structure.

13. The ink supply line support apparatus of claim 12 wherein the elongate guide structure is a chain-like structure having a plurality of guide link elements pivotally connected to one another.

14. The ink supply line support apparatus of claim 12 wherein the elongate guide structure is relatively rigid in a first orientation of a plane through which the print carriage traverses across the ink jet printer and is relatively flexible in a second orientation of the plane that is transverse to the first orientation.

15. The ink supply line support apparatus of claim 12 wherein the elongate guide structure forms a generally U-shaped structure having an outwardly facing exposed surface and an inwardly facing exposed surface and the attachment mechanisms are positioned along the outwardly facing exposed surface.

16. The ink supply line support apparatus of claim 12 wherein the fixed location at which the first end of the elongate guide structure is attached to the ink jet printer is a longitudinal location that is proximate an end point of a transverse width of the ink jet printer over which the print carriage traverses and has a length that is at least as long as a width of the ink jet printer over which the print carriage traverses.

17. The ink supply line support apparatus of claim 12 wherein the fixed location at which the first end of the elongate guide structure is attached to the ink jet printer is a longitudinal location that is proximate a mid-point of a transverse width of the ink jet printer over which the print carriage traverses.

18. The ink supply line support apparatus of claim 12 wherein the print carriage traverses along a guide rail positioned at a forward position in the ink jet printer relative to a path of travel of a print medium through the ink jet printer and wherein the second end of the elongate guide structure is attached to the ink jet printer at a position rearward of the guide rail such that the elongate guide structure is movable in a space within the ink jet printer behind and generally parallel to the guide rail as the print carriage traverses along the guide rail.

19. The ink supply line support apparatus of claim 12 wherein there are a plurality of ink supply lines and wherein the plurality of attachment mechanisms are arranged such that the portion of the plurality of ink supply lines carried by the elongate guide structure are vertically spaced apart from one another.

20. The ink supply line support apparatus of claim 12 further comprising:

a flexible, stiffener longitudinally disposed alongside the elongate guide structure.

21. The ink supply line support apparatus of claim 12 further comprising:

an outrigger structure to which the second end of the elongate guide structure is attached, the outrigger structure attached to the print carriage opposite a side of the print carriage at which the ink jet cartridges are mounted and extending in a direction opposite from a direction of the ink jet cartridges relative to a guide rail on which the print carriage traverses.

22. The ink supply line support apparatus of claim 12 further comprising:

an in-line attachment structure to which the second end of the elongate guide structure is attached, the in-line attachment structure secured to the print carriage approximately parallel with a longitudinal axis of a guide rail on which the print carriage traverses.

23. A continuous ink refill system for a large format ink jet printer having a print bed that is greater than 61 cm (24 inches) wide and having a print carriage that traverses across a print medium and receives one or more disposable ink jet cartridges, the ink refill system comprising: a replaceable ink supply component including:

at least one disposable ink jet cartridge removably mountable in the print carriage;

at least one ink reservoir external to the print carriage; and at least one flexible ink supply line that couples the at least one ink reservoir to the at least one ink supply container so as to supply ink to the ink jet cartridge during operation of the ink jet printer; and an ink supply line support apparatus including:

an elongate guide structure having a length greater than 30.5 cm (12 inches) and having a first end operably connected to the ink jet printer at a fixed location and a second end operably connected to the print carriage, the second end being movable relative to the first end as the print carriage traverses across the ink jet printer, the guide structure having an exposed surface on which at least a portion of the at least one flexible ink supply line is carried; and attachment means positioned along the guide structure for detachably securing the portion of the at least one ink supply line to the exposed surface of the guide structure.

24. The ink refill system of claim 23 wherein the elongate guide structure is a chain-like structure having a plurality of guide link elements pivotally connected to one another.

25. The ink supply line support apparatus of claim 23 wherein the elongate guide structures is relatively rigid in a first orientation of a plane through which the print carriage traverses across the ink jet printer and is relatively flexible in a second orientation of the plane transverse to the first orientation.

26. The ink supply line support apparatus of claim 23 wherein the elongate guide structure forms a generally U-shaped structure having an outwardly facing exposed surface and an inwardly facing exposed surface and the attachment means is positioned along the outwardly facing exposed surface.

27. The ink refill system of claim 23 wherein the fixed location at which the first end of the elongate guide structure is attached to the ink jet printer is a longitudinal location that is proximate an end point of a transverse width of the ink jet printer over which the print carriage traverses and has a length that is at least as long as a width of the ink jet printer over which the print carriage traverses.

28. The ink refill system of claim 23 wherein the fixed location at which the first end of the elongate guide structure is attached to the ink jet printer is a longitudinal location that is proximate a mid-point of a transverse width of the ink jet printer over which the print carriage traverses.

29. The ink refill system of claim 23 wherein the print carriage traverses along a guide rail positioned at a forward position in the ink jet printer relative to a path of travel of a print medium through the ink jet printer and wherein the second end of the elongate guide structure is attached to the ink jet printer at a position rearward of the guide rail such that the elongate guide structure is movable in a space within the ink jet printer behind and generally parallel to the guide rail as the print carriage traverses along the guide rail.

30. The ink refill system of claim 23 wherein there are a plurality of ink supply lines and wherein the attachment means are arranged such that the portion of the plurality of ink supply lines carried by the elongate guide structure are vertically spaced apart from one another.

31. The ink refill system of claim 23 further comprising:

a flexible, stiffening means longitudinally disposed alongside the elongate guide structure for dampening vibrations in the elongate guide structure means as the print carriage traverses across the ink jet printer.

32. The ink refill system of claim 23 further comprising:

an outrigger structure to which the second end of the elongate guide structure is attached, the outrigger structure attached to the print carriage opposite a side of the print carriage at which the ink jet cartridges are mounted and extending in a direction opposite from a direction of the ink jet cartridges relative to a guide rail on which the print carriage traverses.

33. The ink refill system of claim 23 further comprising:

an in-line attachment structure to which the second end of the elongate guide structure is attached, the in-line attachment structure secured to the print carriage approximately parallel with a longitudinal axis of a guide rail on which the print carriage traverses.

34. The ink refill system of claim 23 the replaceable ink supply component includes a plurality of replaceable subcomponents, each subcomponent including a disposable ink jet cartridge, an ink reservoir and a flexible ink supply line having a pair of ends one of which is inserted into the ink jet cartridge and the ink reservoir, respectively, and each of which is fixedly attached proximate to the end of the ink supply line to the ink jet cartridge and the ink reservoir, respectively.

35. The ink refill system of claim 34 wherein each subcomponent is a unitary replaceable member.

36. An ink supply line support apparatus for a continuous ink refill system for a large format ink jet printer the ink jet printer capable of producing high quality, full ink coverage prints on a print bed that is greater than 61 cm (24 inches) wide and having a print carriage that traverses across a print medium and receives at least one disposable ink jet cartridges, the ink refill system including at least one disposable ink jet cartridge removably mountable in the print carriage, at least one ink reservoir external to the print carriage, and at least one flexible ink supply line that couples the at least one ink reservoir to the at least one ink jet cartridges so as to supply ink to the ink jet cartridge during operation of the ink jet printer, the ink supply line support apparatus comprising:

an elongate, chain-like guide structure having a length greater than 30.5 cm (12 inches) and having a plurality of guide link elements pivotally connected to one another and having a first end operably connected to the ink jet printer at a fixed location and a second end operably connected to the print carriage, the second end being movable relative to the first end in a first orientation along the direction in which the print carriage traverses, but being substantially rigid relative to the first end in a second orientation that is transverse to the first orientation; and means for supporting at least a portion of the at least one ink supply line such that the portion of the at least one ink supply line is carried by the guide structure while the second end of the guide structure is moved relative to the first end of the guide structure as the print carriage traverses across the ink jet printer.

37. The ink supply line support apparatus of claim 36 wherein the fixed location at which the first end of the elongate guide structure is attached to the ink jet printer is a longitudinal location that is proximate an end point of a transverse width of the ink jet printer over which the print carriage traverses and has a length that is at least as long as a width of the ink jet printer over which the print carriage traverses.

38. The ink supply line support apparatus of claim 36 wherein the fixed location at which the first end of the elongate guide structure is attached to the ink jet printer is a longitudinal location that is proximate a mid-point of a transverse width of the ink jet printer over which the print carriage traverses.

39. The ink supply line support apparatus of claim 36 wherein the print carriage traverses along a guide rail positioned at a forward position in the ink jet printer relative to a path of travel of a print medium through the ink jet printer and wherein the second end of the elongate guide structure is attached to the ink jet printer at a position rearward of the guide rail such that the elongate guide structure is movable in a space within the ink jet printer behind and generally parallel to the guide rail as the print carriage traverses along the guide rail.

40. The ink supply line support apparatus of claim 36 wherein there are a plurality of ink supply lines and wherein the means for supporting is arranged such that the portion of the plurality of ink supply lines carried by the elongate guide structure means are vertically spaced apart from one another.

41. The ink supply line support apparatus of claim 36 further comprising:

a flexible, stiffening means longitudinally disposed alongside the elongate guide structure for increasing uniformity of movement of the elongate guide structure means as the print carriage traverses across the ink jet printer.

42. The ink supply line support apparatus of 36 further comprising:

an outrigger structure to which the second end of the elongate guide structure is attached, the outrigger structure attached to the print carriage opposite a side of the print carriage at which the ink jet cartridges are mounted and extending in a direction opposite from a direction of the ink jet cartridges relative to a guide rail on which the print carriage traverses.

43. The ink supply line support apparatus of claim 36 further comprising:

an in-line attachment structure to which the second end of the elongate guide structure is attached, the in-line attachment structure secured to the print carriage approximately parallel with a longitudinal axis of a guide rail on which the print carriage traverses such that vibrations in the elongate guide structure are generally not translated into a moment arm about the print carriage.

* * * * *